(12) United States Patent
Kim et al.

(10) Patent No.: US 12,542,321 B2
(45) Date of Patent: Feb. 3, 2026

(54) BATTERY MODULE AND BATTERY PACK INCLUDING THE SAME

(71) Applicant: LG ENERGY SOLUTION, LTD., Seoul (KR)

(72) Inventors: Gwan Woo Kim, Daejeon (KR); Junyeob Seong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 543 days.

(21) Appl. No.: 18/011,768

(22) PCT Filed: Oct. 20, 2021

(86) PCT No.: PCT/KR2021/014649
§ 371 (c)(1),
(2) Date: Dec. 20, 2022

(87) PCT Pub. No.: WO2022/092677
PCT Pub. Date: May 5, 2022

(65) Prior Publication Data
US 2023/0335842 A1    Oct. 19, 2023

(30) Foreign Application Priority Data

Oct. 26, 2020    (KR) .................. 10-2020-0139306

(51) Int. Cl.
| | |
|---|---|
| *H01M 50/211* | (2021.01) |
| *H01M 50/20* | (2021.01) |
| *H01M 50/204* | (2021.01) |
| *H01M 50/242* | (2021.01) |
| *H01M 50/289* | (2021.01) |

(52) U.S. Cl.
CPC ......... *H01M 50/211* (2021.01); *H01M 50/20* (2021.01); *H01M 50/204* (2021.01); *H01M 50/289* (2021.01); *H01M 50/242* (2021.01); *H01M 2220/20* (2013.01)

(58) Field of Classification Search
None
See application file for complete search history.

(56) References Cited

U.S. PATENT DOCUMENTS

2011/0250477 A1    10/2011  Yoshida et al.
2018/0337377 A1*   11/2018  Stephens ............. H01M 50/224
(Continued)

FOREIGN PATENT DOCUMENTS

| CN | 207282536 U | 4/2018 |
|---|---|---|
| KR | 10-2007-0101025 A | 10/2007 |

(Continued)

OTHER PUBLICATIONS

International Search Report for PCT/KR2021/014649 mailed on Feb. 3, 2022.

*Primary Examiner* — Maria Laios
(74) *Attorney, Agent, or Firm* — Birch, Stewart, Kolasch & Birch, LLP (57) ABSTRACT

Discussed is a battery module that may include a plurality of battery cell stacks, and a module frame on which the plurality of battery cell stacks are mounted and has a shaping part that partitions the module frame into a plurality of unit housing sections, wherein the plurality of battery cell stacks are housed in the plurality of unit housing sections, respectively, of the module frame.

10 Claims, 6 Drawing Sheets

(56) References Cited

U.S. PATENT DOCUMENTS

| | | |
|---|---|---|
| 2019/0081298 A1 | 3/2019 | Matecki et al. |
| 2020/0067040 A1 | 2/2020 | Kim et al. |
| 2020/0127255 A1 | 4/2020 | Moon et al. |
| 2020/0127349 A1 | 4/2020 | Park et al. |
| 2020/0144568 A1 | 5/2020 | Lee et al. |
| 2020/0212390 A1 | 7/2020 | Kume et al. |
| 2020/0328386 A1* | 10/2020 | Kellner ............... H01M 50/224 |
| 2020/0365850 A1* | 11/2020 | Shinoda ............ H01M 10/6567 |
| 2020/0411816 A1* | 12/2020 | Yoneyama .......... H01M 10/613 |
| 2021/0031836 A1* | 2/2021 | Greber .............. H01M 10/6556 |
| 2021/0036277 A1 | 2/2021 | Seo et al. |
| 2021/0305651 A1 | 9/2021 | You et al. |

FOREIGN PATENT DOCUMENTS

| | | |
|---|---|---|
| KR | 10-1278015 B1 | 6/2013 |
| KR | 10-2017-0103238 A | 9/2017 |
| KR | 10-2019-0106060 A | 9/2019 |
| KR | 10-2020-0021609 A | 3/2020 |
| KR | 10-2020-0033666 A | 3/2020 |
| KR | 10-2020-0044577 A | 4/2020 |
| KR | 10-2020-0044580 A | 4/2020 |
| KR | 10-2020-0052658 A | 5/2020 |
| WO | WO 2019/049760 A1 | 3/2019 |

\* cited by examiner

BATTERY MODULE AND BATTERY PACK INCLUDING THE SAME

TECHNICAL FIELD

Cross Citation with Related Application(s)

This application claims the benefit of Korean Patent Application No. 10-2020-0139306 filed on Oct. 26, 2020 with the Korean Intellectual Property Office, the disclosure of which is incorporated herein by reference in its entirety.

The present disclosure relates to a battery module and a battery pack including the same, and more particularly, to a battery module that controls cell swelling, and a battery pack including the same.

BACKGROUND

A secondary battery attracts considerable attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

Such a battery module includes a battery cell stack in which a plurality of battery cells are stacked, a module frame for housing the battery cell stack, and a compression pad formed between the module frame and the outermost battery cells of the battery cell stack or between a plurality of battery cells.

Figure 1:
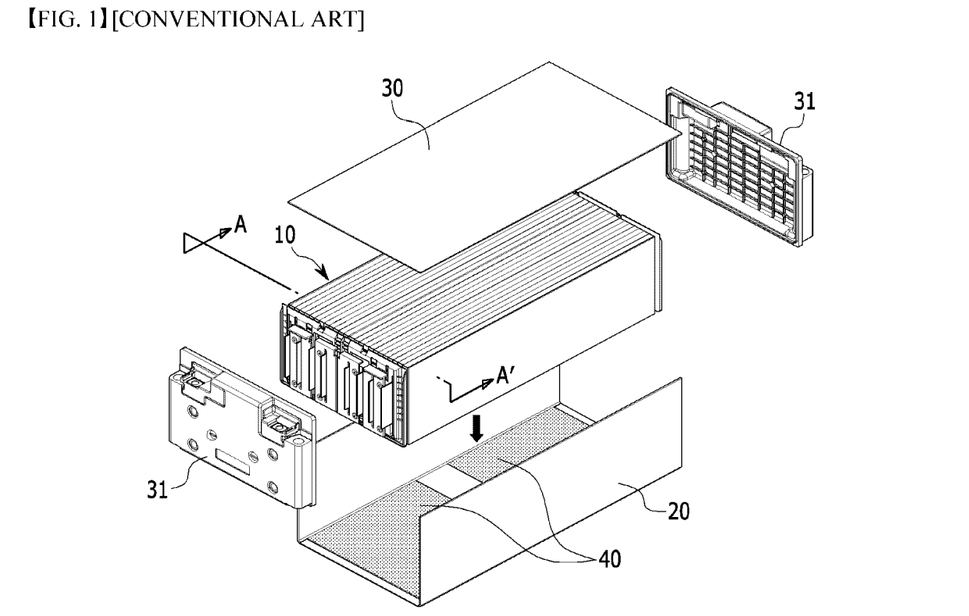
FIG. 1 is a perspective view showing a conventional battery module.
Figure 2:
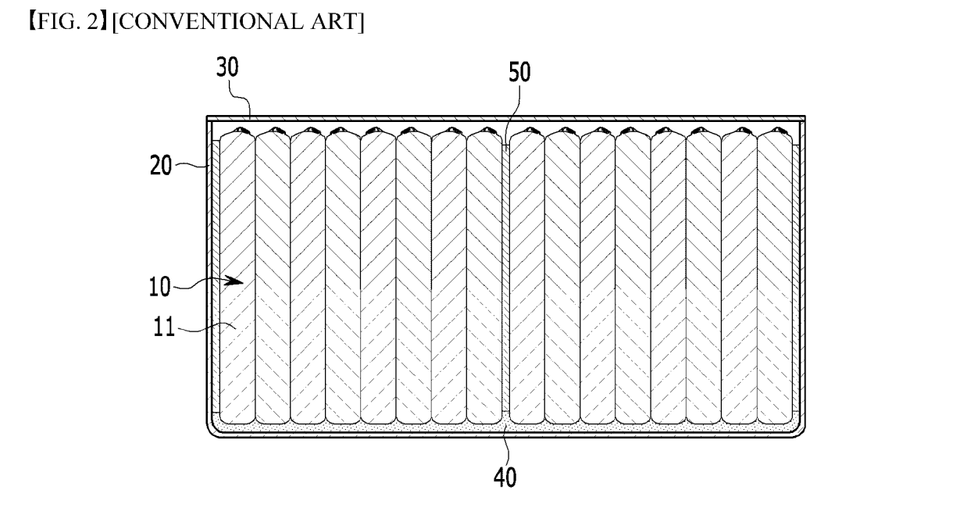
FIG. 2 is a cross-sectional view showing a section A-A' of FIG. 1.
Figure 3:
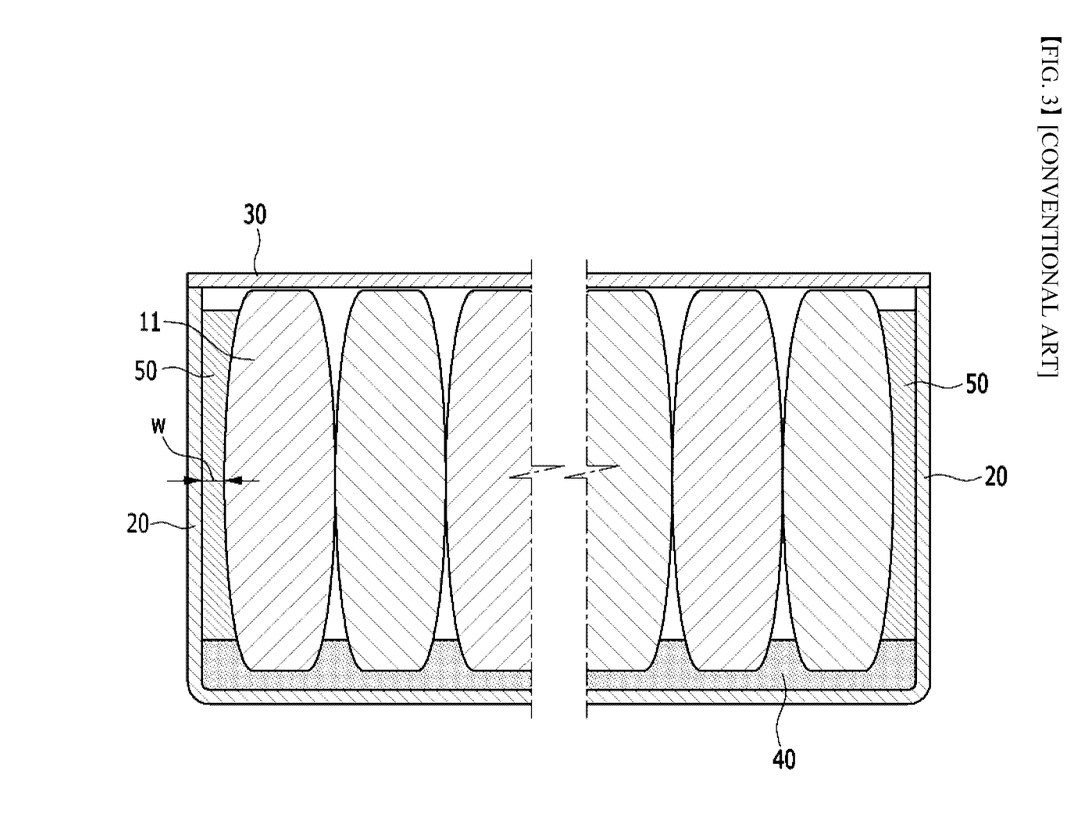
FIG. 3 is a diagram showing a swelling phenomenon of the battery cell of FIG. 2.

FIG. 1 is a perspective view showing a conventional battery module. FIG. 2 is a cross-sectional view showing a section A-A' of FIG. 1. FIG. 3 is a diagram showing a swelling phenomenon of the battery cell of FIG. 2.

Referring to FIGS. 1 and 2, the conventional battery module includes a battery cell stack 10 in which a plurality of battery cells 11 are stacked, a module frame 20 for housing the battery cell stack, an upper plate 30 for covering the upper part of the battery cell stack 10, end plates 31 attached to the module frame 20, a thermal conductive resin layer 40 located between the battery cell stack 10 and the bottom part of the module frame 20, and a compression pad 50 located between the plurality of battery cells 11 and/or between the outermost battery cell 11 and the module frame 20.

The compression pad 50 may be formed so as to cover most of the side surfaces of the module frame 20 corresponding to the battery cell 11. At this time, when the swelling phenomenon of the battery cells 11 occurs, the battery cells 11 may swell as shown in FIG. 3. Conventionally, even if the compression pad 50 is pressurized and compressed, there is a minimum compression thickness w at which the compression pad 50 is no longer compressed, which causes a problem that it is difficult to flexibly cope with the swelling phenomenon of the battery cells 11.

DETAILED DESCRIPTION OF THE INVENTION

Technical Problem

It is an object of the present disclosure to provide a battery module that controls cell swelling, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module including: a plurality of battery cell stacks, and a module frame on which the plurality of battery cell stacks are mounted, and having a shaping part that partitions the module frame into a plurality of unit housing sections, wherein the plurality of battery cell stacks are housed in the plurality of unit housing sections, respectively, of the module frame.

The shaping part may include two side surface parts separated from each other, and a connection part that connects the two side surface parts.

The connection part may connect the two side surface parts separated from each other at upper ends of the two side surface parts.

The connection part may have a curved surface that is protruded at the upper ends.

The two side surface parts of the shaping part may be surfaces perpendicular to a stacking direction of a plurality of battery cells of the plurality of battery cell stacks.

The module frame includes a plurality of bottom parts and left and right side surface parts, and the plurality of bottom parts may be connected by the shaping part.

The plurality of bottom parts, the left and right side surface parts, and the shaping part are integrally formed.

The battery module may further include a compression pad located between the left side surface part or the right side surface part of the module frame and an outermost battery cell included in a battery cell stack of the plurality of battery cell stacks.

The battery module may further include a compression pad located between the shaping part and an outermost battery cell included in a battery cell stack of the plurality of battery cell stacks.

The plurality of battery cell stacks include a plurality of sub-unit battery cell stacks, and each sub-unit battery cell stack may be housed in a unit housing section among the plurality of unit housing sections may be separated from an adjacent sub-unit battery cell stack by the shaping part.

According to another embodiment of the present disclosure, there is provided a battery pack including the above-mentioned battery module.

Advantageous Effects

According to embodiments of the present disclosure, a shaping part of the module frame is formed instead of a conventional compression pad, thereby capable of absorbing cell swelling.

In addition, through complete separation of the sub-unit battery cell stack, it is possible to block the generation of heat propagation when the battery cell ignites.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and same or like reference numerals designate same or like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 4:
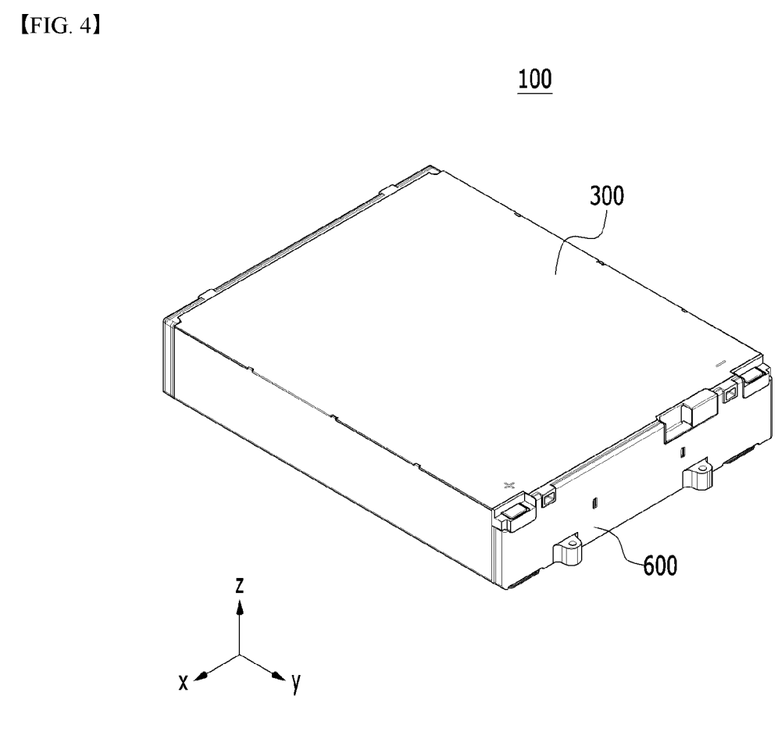
FIG. 4 is a perspective view of a battery module according to an embodiment of the present disclosure.
Figure 5:
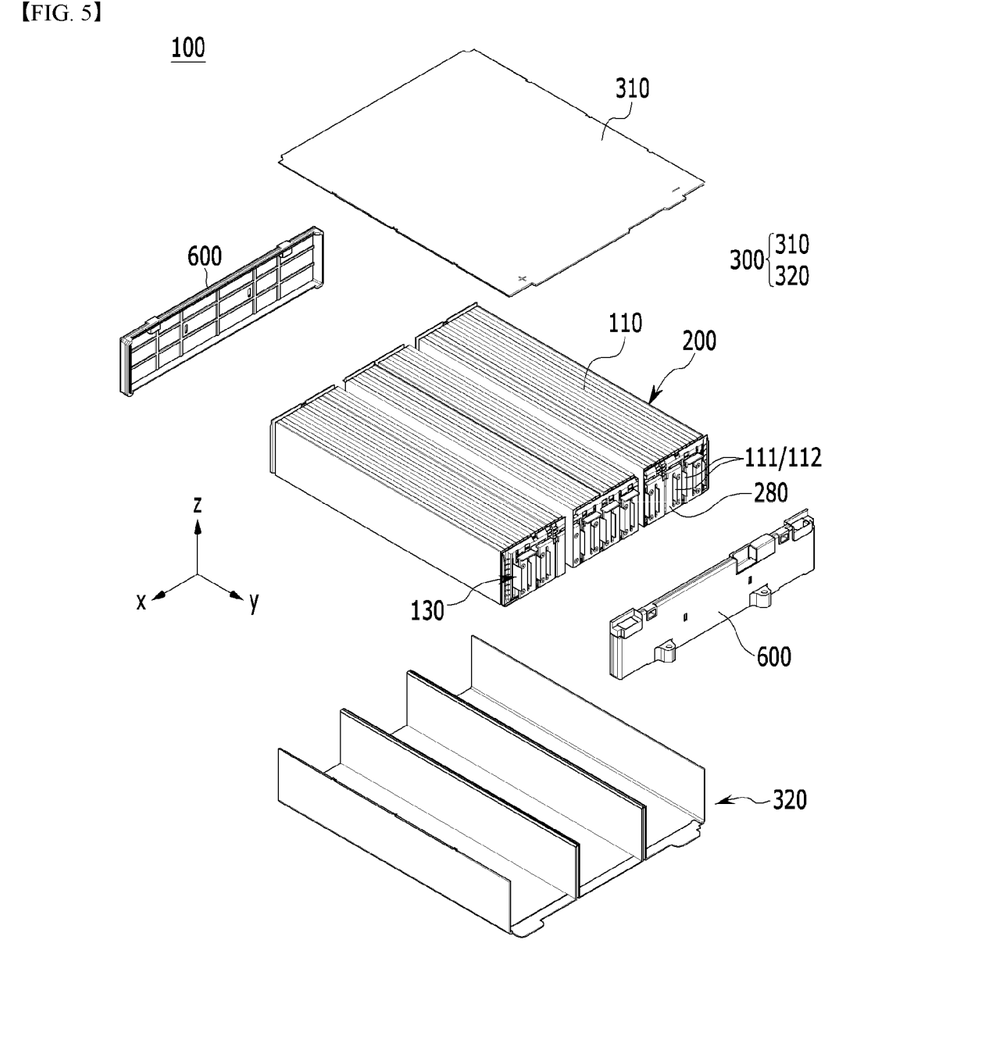
FIG. 5 is an exploded perspective view of the battery module of FIG. 4.

FIG. 4 is a perspective view of a battery module according to an embodiment of the present disclosure. FIG. 5 is an exploded perspective view of the battery module of FIG. 4.

Referring to FIGS. 4 and 5, the battery module 100 according to the present embodiment includes a battery cell stack 200 in which a plurality of battery cells 110 are stacked, busbar frames 130 attached to both ends of the battery cell stack 200, a frame member 300 for housing the battery cell stack 200, and end plates 600 that wrap a cell block to which the battery cell stack 200 and the busbar frame 130 are coupled at both ends.

The battery cell 110 is preferably a pouch type battery cell. In the present embodiment, the battery cell stack 200 is stacked in the x-axis direction of FIG. 5, is disposed inside the frame member 300 in the z-axis direction, and can be cooled by a thermal conductive resin layer (not shown) formed on the bottom part of the frame member 300.

The frame member 300 for housing the battery cell stack 200 may include an upper plate 310 and a module frame 320. The module frame 320 includes a plurality of unit housing sections S1, S2, S3, and the upper plate 310 may be formed in a plate-shaped structure that covers the upper part of the battery cell stack 200 mounted to the module frame 320. The module frame 320 wraps the lower surface and both side surfaces of the battery cell stack 200, and the upper plate 310 may wrap the remaining upper surface (z-axis direction). The upper plate 310 and the module frame 320 are coupled by welding or the like in a state in which the edge parts corresponding to each other are in contact with each other, so that a structure that covers the battery cell stack 200 vertically and horizontally can be formed. The battery cell stack 200 can be physically protected through the upper plate 310 and the module frame 320. For this purpose, the upper plate 310 and the module frame 320 may include a metal material having a predetermined strength.

Meanwhile, although not specifically shown in the figure, the frame member 300 according to a modified example may be a mono frame in the form of a metal plate in which the upper surface, the lower surface, and both sides are integrated. That is, the frame structure may not be a structure in which the module frame 320 and the upper plate 310 are combined to each other, but may be manufactured by extrusion shaping and have a structure in which the upper surface, the lower surface, and both side surfaces are integrated.

A busbar frame 130 may be located on the opened first side (y-axis direction) and the opened second side (direction opposite to the y-axis) of the battery cell stack 200. The busbar frame 130 is located on the first side (y-axis direction) and the second side (direction opposite to the y-axis) of the battery cell stack 200 to cover the battery cell stack 200, and at the same time, can serve to guide the connection between the battery cell stack 200 and the external device. Specifically, a busbar 280 may be mounted to the busbar frame 130, and the electrode leads 111 and 112 of the battery cells 110 may pass through a slot formed in the busbar frame 130 and then be bent to be joined to the busbar 280. Thereby, the battery cells 110 constituting the battery cell stack 200 may be connected in series or in parallel.

The end plate 600 may be located on the opened first side (y-axis direction) and the second side (direction opposite to the y-axis) of the frame member 300 to cover the battery cell stack 200. The end plate 600 can physically protect the battery cell stack 200 and other electrical components from external impacts. A busbar frame 130 may be located between the battery cell stack 200 and the end plate 600.

Meanwhile, although not specifically shown in the figure, an insulating cover for electrical insulation may be formed between the busbar frame 130 and the end plate 600.

Figure 6:
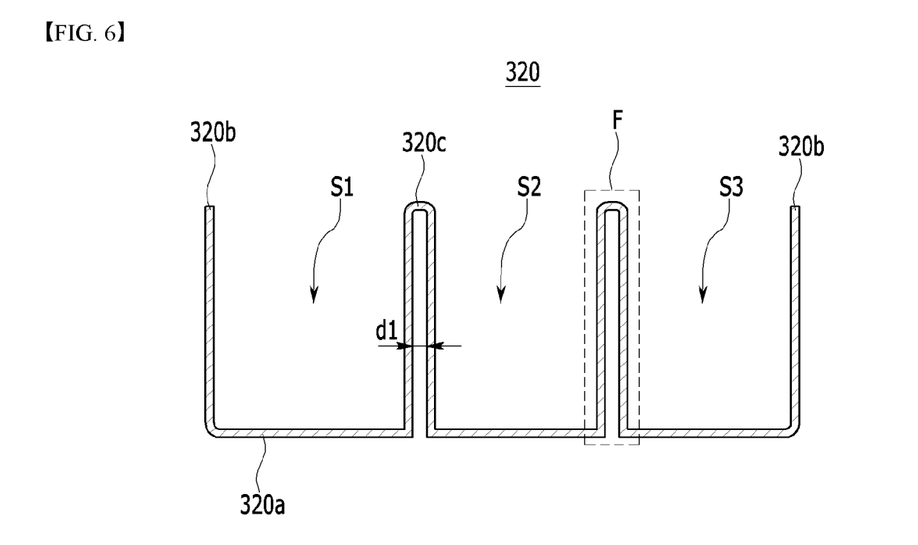
FIG. 6 is a diagram showing the module frame of FIG. 5.
Figure 7:
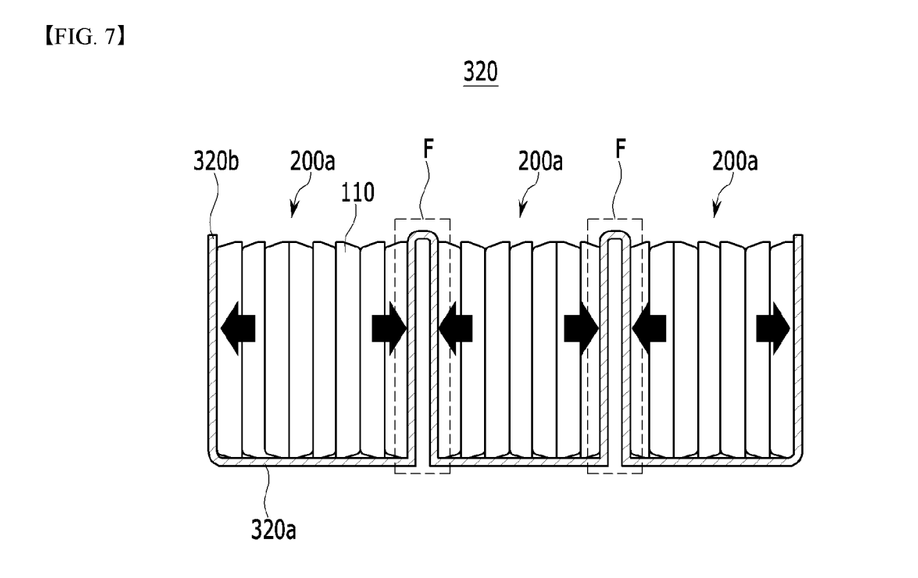
FIG. 7 is a diagram showing a state in which the battery cell stack is mounted in the module frame of FIG. 6.

FIG. 6 is a diagram showing the module frame of FIG. 5. FIG. 7 is a diagram showing a state in which the battery cell stack is mounted in the module frame of FIG. 6, Referring to FIGS. 6 and 7, the module frame 320 according to the present embodiment includes a plurality of unit housing sections S1, S2, S3. The structure of the module frame 320 is modified to form a shaping part F, and a plurality of unit housing sections S1, S2, S3 can be defined by the shaping part F. The battery cell stack 200 may be mounted in sub-units in each of the plurality of unit housing sections S1, S2, S3. The sub-unit battery cell stack 200a includes a plurality of battery cells 110. After the sub-unit battery cell stack 200a is mounted to the unit housing sections S1, S2, S3, through the joining between the electrode leads and the busbar on the busbar frame 130 described in FIG. 5, electrical connection can also be made between the sub-unit battery cell stacks 200a.

Specifically, the module frame 320 may include a bottom part 320a and two side surface parts 320b extending upward from both ends of the bottom part 320a. The bottom part 320a includes a plurality of plate-shaped members extending along the y-axis direction, and a shaping part F is formed between the bottom part 320a located in the middle and the bottom part 320a located close to the side surface part 320b. The shaping part F may include two side surface parts separated by a first distance d1 and a connection part 320c connecting them. The connection part 320c can connect two side surface parts separated by a first distance d1 from upper ends of the side surface parts, at the upper ends of the side surface parts. The connection part 320c may have a curved surface that is protruded at the upper end. The shaping part F may have a U-shaped inverted shape.

A sub-unit battery cell stack 200a may be mounted in the plurality of unit housing sections S1, S2, S3 partitioned by the shaping part F. Each of the bottom parts 320a may cover a lower surface (direction opposite to the z-axis) of the sub-unit battery cell stack 200a, and the side surface part 320b and the shaping part F may cover both side surfaces (x-axis direction and direction opposite thereto) of the sub-unit battery cell stack 200a.

According to the present embodiment, the shaping part F is formed between the sub-unit battery cell stack 200a, and the cell swelling can be controlled by a sufficient swelling absorption effect when the cell swelling occurs. In addition, through the complete separation of the sub-unit battery cell stack 200a, it is possible to block the generation of heat propagation when the battery cell 110 ignites.

Figure 8:
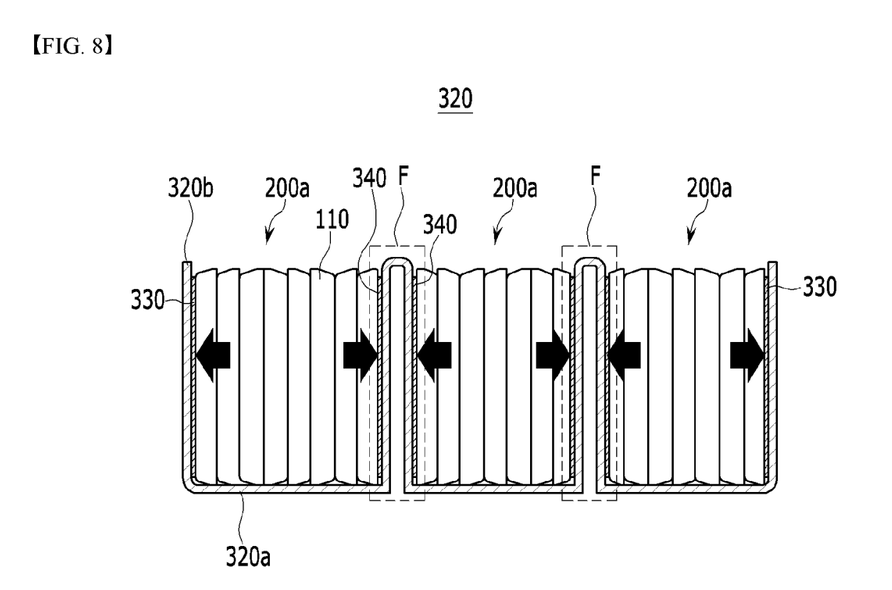
FIG. 8 is a diagram showing a state in which the battery cell stack is mounted in the module frame included in the battery module according to another embodiment of the present disclosure.

FIG. 8 is a diagram showing a state in which the battery cell stack is mounted in the module frame included in the battery module according to another embodiment of the present disclosure.

Since the present embodiment is mostly the same as the embodiment described with reference to FIG. 7, only the differences will be described below.

Referring to FIG. 8, the battery module according to the present embodiment further includes a compression pad 330 that are located between the side surface part 320b of the module frame 320 and the outermost battery cell 110 included in the sub-unit battery cell stack 200a. In addition, the battery module may further include a compression pad 340 located between the shaping part F and the outermost battery cell 110 close to the shaping part F. The expansion force applied to the both left and right side surfaces 320b of the module frame 320 due to the generation of the swelling of the left and right outermost battery cells of the battery cell stack 200 can be absorbed by additional compression pads 330 and 340.

Except for the differences described above, all the contents described in the embodiments of FIG. 7 are also applicable to the present embodiment.

Meanwhile, one or more battery modules according to an embodiment of the present disclosure can be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the invention has been shown and described with reference to the preferred embodiments, the scope of the present disclosure is not limited thereto, and numerous other modifications and improvements can be devised by those skilled in the art, without departing from the spirit and scope of the principles of the invention described in the appended claims.

DESCRIPTION OF REFERENCE NUMERALS

110: battery cell
320: module frame
320a: bottom part
320b: side surface part
320c: connection part
F: shaping part

The invention claimed is:

1. A battery module comprising:
a plurality of battery cell stacks, and
a module frame on which the plurality of battery cell stacks are mounted, and having a shaping part that partitions the module frame into a plurality of unit housing sections,
wherein the plurality of battery cell stacks are housed in the plurality of unit housing sections, respectively, of the module frame,
wherein the shaping part comprises two side surface parts separated from each other, and a connection part that connects the two side surface parts,
wherein the two side surface parts of the shaping part are surfaces perpendicular to a stacking direction of a plurality of battery cells of the plurality of battery cell stacks, and
wherein the two side surface parts are separated by a hollow gap that is empty.

2. The battery module according to claim 1, wherein:
the connection part connects the two side surface parts separated from each other at upper ends of the two side surface parts.

3. The battery module according to claim 2, wherein:
the connection part has a curved surface that is protruded at the upper ends.

4. The battery module according to claim 1, wherein:
the module frame comprises a plurality of bottom parts and left and right side surface parts, and
the plurality of bottom parts are connected by the shaping part.

5. The battery module according to claim 4, wherein:
   the plurality of bottom parts, the left and right side surface parts, and the shaping part are integrally formed.

6. The battery module according to claim 4, further comprising a compression pad located between the left side surface part or the right side surface part of the module frame and an outermost battery cell included in a battery cell stack of the plurality of battery cell stacks.

7. The battery module according to claim 4, further comprising a compression pad located between the shaping part and an outermost battery cell included in a battery cell stack of the plurality of battery cell stacks.

8. The battery module according to claim 1, wherein:
   the plurality of battery cell stacks include a plurality of sub-unit battery cell stacks,
   each sub-unit battery cell stack housed in a unit housing section among the plurality of unit housing sections is separated from an adjacent sub-unit battery cell stack by the shaping part.

9. A battery pack comprising the battery module according to claim 1.

10. The battery module according to claim 1, further comprising an end plate located at an opened side of the module frame,
   wherein the end plate covers the shaping part and overlaps ends of the two side surface parts of the shaping part and busbar frames of the plurality of battery cell stacks.

* * * * *